United States Patent
Tatsuzawa (10) Patent No.: US 7,213,190 B2
(45) Date of Patent: May 1, 2007

(54) DATA PROCESSING APPARATUS AND METHOD

(75) Inventor: Yukiyasu Tatsuzawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 547 days.

(21) Appl. No.: 10/743,453

(22) Filed: Dec. 23, 2003

(65) Prior Publication Data

US 2004/0139379 A1    Jul. 15, 2004

(30) Foreign Application Priority Data

Dec. 27, 2002   (JP)   .............................. 2002-380279

(51) Int. Cl.
*H03M 13/00* (2006.01)

(52) U.S. Cl. ...................... 714/755; 714/771; 714/775; 714/785; 714/786; 375/240.28; 370/510

(58) Field of Classification Search ................ 714/771, 714/755, 775, 785
See application file for complete search history.

(56) References Cited

U.S. PATENT DOCUMENTS 5,438,692 A * 8/1995 Mohindra .................... 455/324

6,697,989 B1 * 2/2004 Maeda et al. ................ 714/755

FOREIGN PATENT DOCUMENTS

| JP | 11-066762 | 3/1999 |
| JP | 11-175362 | 7/1999 |
| JP | 11-282701 | 10/1999 |
| JP | 2001-67822 | 3/2001 |
| JP | 2002-74861 | 3/2002 |

OTHER PUBLICATIONS

Japanese Office Action dated Apr. 12, 2005 for Appln. No. 2002-380279.

* cited by examiner

*Primary Examiner*—Guy J. Lamarre
(74) *Attorney, Agent, or Firm*—Pillsbury Winthrop Shaw Pittman LLP (57) ABSTRACT

A data processing apparatus according an aspect of this invention has a syndrome calculation unit configured to calculate the syndrome of a demodulated data sequence. The syndrome calculation unit includes a calculation unit configured to make the calculation required to realize syndrome calculation of demodulated data for each frame obtained by removing the sync code from one sync frame.

8 Claims, 5 Drawing Sheets

| Normal case (frames arrive successively) | SW1 | SW2 | SW3 | SW4 | SW5 |
|---|---|---|---|---|---|
| Calculate first 91 bytes | c | d | f | off | off |
| Store calculation result | a | d | f | off | off |
| Calculate second 91 bytes | c | d | f | off | off |
| Store total in buffer | b | d | f | on | on |

| When second frame has been lost | SW1 | SW2 | SW3 | SW4 | SW5 |
|---|---|---|---|---|---|
| Calculate first 91 bytes | c | d | f | off | off |
| Store calculation result | a | d | f | off | off |
| Store total in buffer | c | d | f | on | on |

| When first frame has been lost | SW1 | SW2 | SW3 | SW4 | SW5 |
|---|---|---|---|---|---|
| Calculate second 91 bytes | c | d | f | off | off |
| Store total in buffer | b | d | f | off | on |

| When second frame arrives later | SW1 | SW2 | SW3 | SW4 | SW5 |
|---|---|---|---|---|---|
| Calculate second 91 bytes<br>Call calculation result simultaneously | c | d | g | off | off |
| Store total in buffer | a | e | g | on | on |

| When first frame arrives later | SW1 | SW2 | SW3 | SW4 | SW5 |
|---|---|---|---|---|---|
| Calculate first 91 bytes<br>Call calculation result simultaneously | c | d | g | off | off |
| Store total in buffer | b | d | g | on | on |

DATA PROCESSING APPARATUS AND METHOD

CROSS-REFERENCE TO RELATED APPLICATIONS

This application is based upon and claims the benefit of priority from the prior Japanese Patent Application No. 2002-380279, filed Dec. 27, 2002, the entire contents of which are incorporated herein by reference.

BACKGROUND OF THE INVENTION

1. Field of the Invention

The present invention relates to a data processing apparatus and method for applying an error correction process to data read from an information storage medium such as a digital versatile disk (DVD) and, more particularly, to a data processing apparatus and method for making syndrome calculations.

2. Description of the Related Art

In recent years, DVDs that record digital data have prevailed remarkably. On a DVD, sector data generated from error correction code blocks is recorded.

Each error correction code block is made up of a block of information symbols arranged in the row and column directions, inner-code PI parity which is appended to information symbols in the row direction contained in the information symbol block, and outer-code PO parity which is appended to both information symbols in the column direction contained in the information symbol block and the inner-code PI parity.

An error correction code in the PO direction has a code length of 208 bytes, an information length of 192 bytes, and a minimum distance of 17. An error correction code in the PI direction has a code length of 182 bytes, an information length of 172 bytes, and a minimum distance of 11.

Sector data generated from such error correction code block contains an error correction code, and can undergo error correction using this error correction code. Such a technique is disclosed in Jpn. Pat. Appln. KOKAI Publication No. 2002-74861.

Also, Jpn. Pat. Appln. KOKAI Publication No. 2001-67822 discloses a technique associated with an error correction process that can cope with the playback speed in a high multiple-speed mode. That is, this reference discloses a technique for calculating a syndrome for data with a code length of 182 bytes in the PI direction contained in playback information in parallel with a process for temporarily storing the playback information read out from a DVD in a buffer.

However, the method of calculating a syndrome parallel to the data write process to the buffer (disclosed in Jpn. Pat. Appln. KOKAI Publication No. 2001-67822) can offer an advantage in coping with high multiple-speed playback, but poses a problem of a measure against sync abnormality in a DVD.

In fact, upon conversion into sector data, data with a code length of 182 bytes in the PI direction forms two Sync frames. One Sync frame contains a sync code (2 bytes) and 91 bytes of the code length of 182 bytes in the PI direction.

A DVD system executes a synchronization process for respective Sync frames. A sync system suffers abnormality for various reasons such as the state of the servo system of the DVD system, scratches, fingerprints, dust, and the like, and at least one Sync frame may be lost or duplicated, or the arrival order of frames may be reversed.

Such problem with of Sync frames often disturbs the calculation of an effective syndrome of a data sequence (the code length of 182 bytes in the PI direction). Even if 91 bytes of one Sync frame are correct data, all 182 bytes of both the Sync frames may be consequently determined as error data. Such a burst error results in an error correction performance drop and causes correction errors.

BRIEF SUMMARY OF THE INVENTION

A data processing apparatus according to an aspect of the present invention comprises a syndrome calculation unit configured to calculate a syndrome of a demodulated data sequence, and the syndrome calculation unit includes calculation means configured to make a calculation required to realize syndrome calculation of demodulated data for each frame obtained by removing the sync code from one sync frame.

A data processing method according to an aspect of the present invention comprises making a calculation required to realize syndrome calculation of demodulated data for each frame obtained by removing the sync code from one sync frame upon calculating a syndrome of the demodulated data.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below serve to explain the principles of the invention.

DETAILED DESCRIPTION OF THE INVENTION

An embodiment of the present invention will be described hereinafter with reference to the accompanying drawings.

Figure 1:
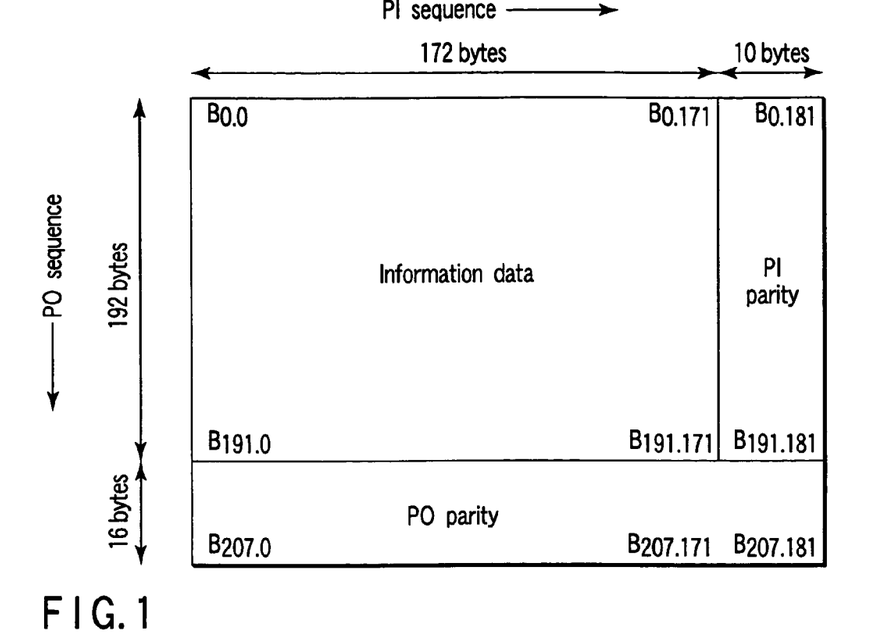
FIG. 1 shows an example of the data structure of an error correction code block.

FIG. 1 shows an example of the data structure of an error correction code block.

As shown in FIG. 1, an error correction code block is made up of a block of information symbols (information data) arranged in the column direction (PO sequence) and row direction (PI sequence), inner-code PI parity which is appended to information symbols in the row direction contained in the information symbol block, and outer-code PO parity which is appended to both information symbols in the column direction contained in the information symbol block and the inner-code PI parity.

An error correction code in the PO direction has a code length of 208 bytes, an information length of 192 bytes, and a minimum distance of 17. An error correction code in the PI direction has a code length of 182 bytes, an information length of 172 bytes, and a minimum distance of 11.

Figure 2:
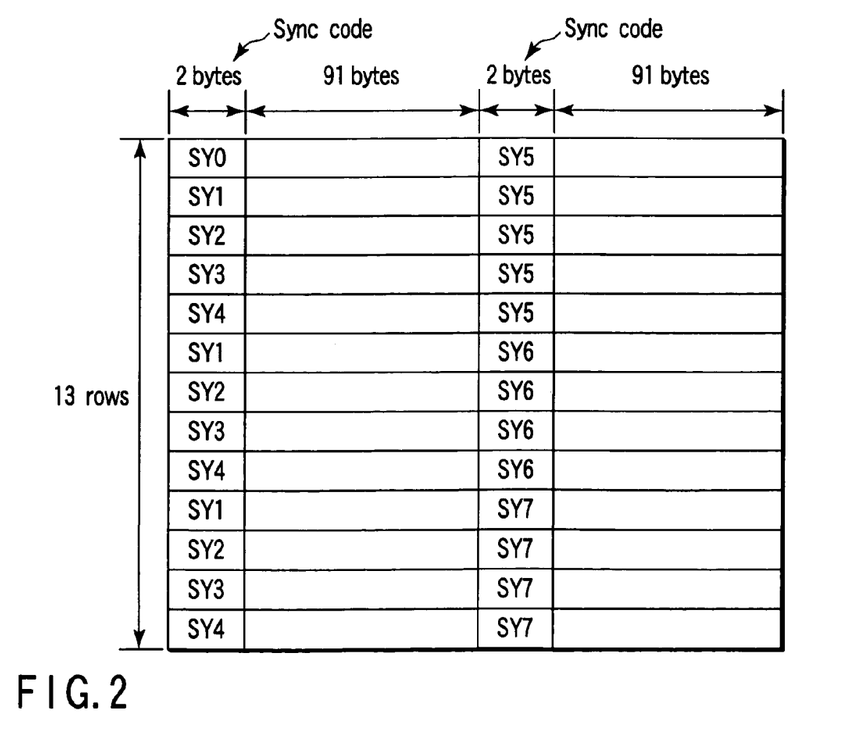
FIG. 2 shows an example of the data structure of a data block with sync codes, which is recorded on an information storage medium such as a DVD for respective predetermined recording units (sectors)

FIG. 2 shows an example of the data structure of a data block with sync code, which is recorded on an information storage medium such as a DVD for respective predetermined recording units (sectors).

As shown in FIG. 2, a data block with sync codes is generated by inserting sync codes in sector data at given intervals.

Sector data is generated from some data of the error correction code block shown in FIG. 1. More specifically, a block of 192 rows formed by the information symbol (information data) block and PI parity is divided into 16 blocks. That is, one divided block is formed of 12 rows. One of 16 PO parity rows is added to one divided block formed of 12 rows to generate sector data of 13 rows. The total number of divided blocks is 16, and the total number of rows of PO parity is also 16. Hence, by adding one row of PO parity to each divided block, 16 sector data are generated. One sector data has (12+1) rows and (172+10) bytes per row.

When sync codes are inserted in the sector data generated in this way at, e.g., 91-byte intervals, a data block with sync codes shown in FIG. 2 is generated. The data block with sync codes has 13 rows and 186 bytes per row, as shown in FIG. 2. One row of the data block with sync codes, i.e., a data sequence contains two Sync frames (2+91+2+91 bytes). One Sync frame (2+91 bytes) contains a sync code (2 bytes) and some data of the sector data. A modulated data sequence obtained by removing sync codes from one data sequence contains an error correction code, and error correction can be achieved using this modulated data sequence.

Figure 3:
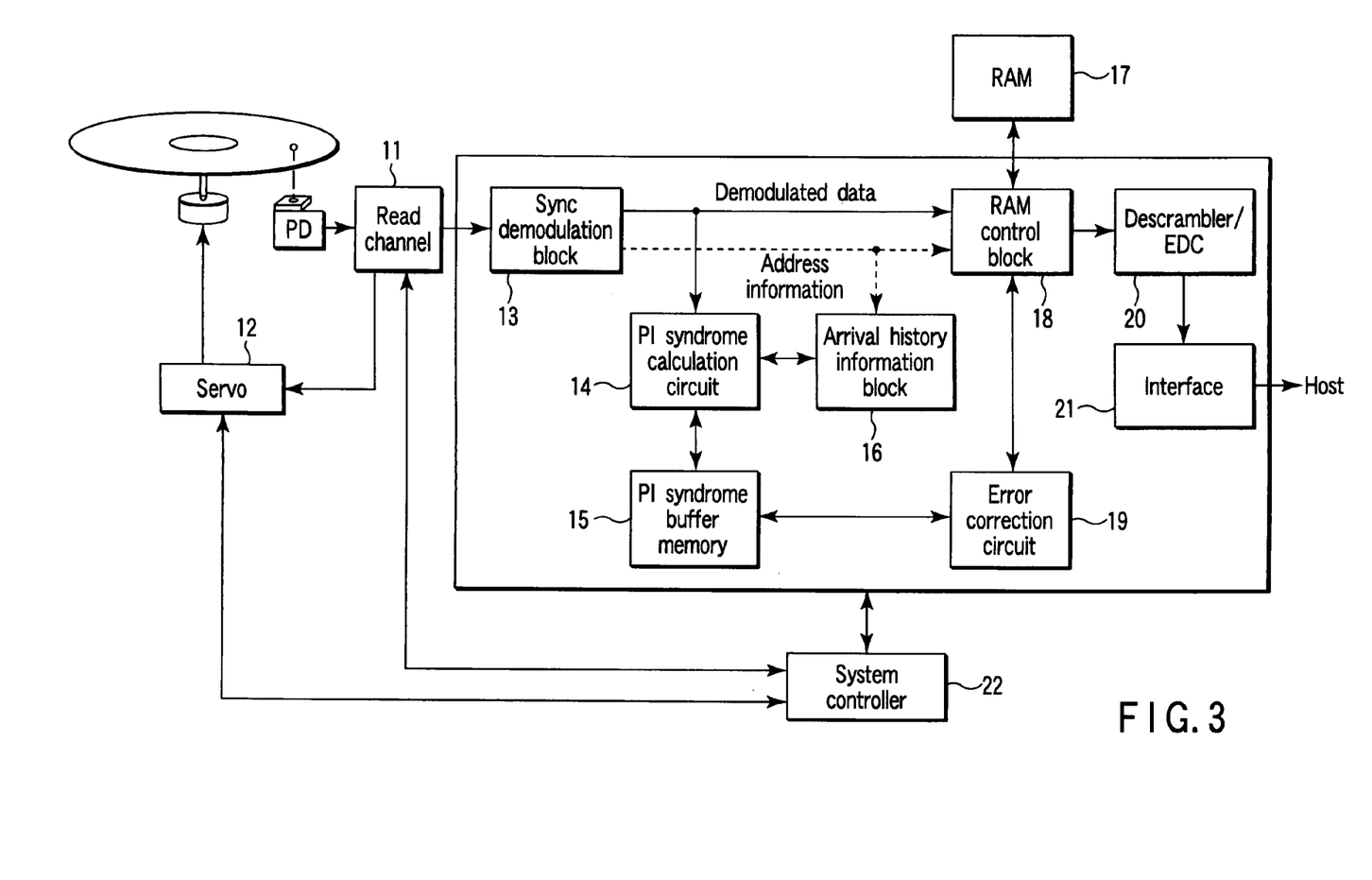
FIG. 3 is a schematic block diagram showing the arrangement of a DVD playback system (data processing apparatus) according to an embodiment of the present invention.

FIG. 3 is a schematic block diagram showing the arrangement of a DVD playback system (data processing apparatus) according to an embodiment of the present invention.

The flow of data in blocks will be described first. Data reproduced from a disk by a read channel 11 undergoes a signal process, and is then transmitted to a sync demodulation block 13. The sync demodulation block 13 detects a sync code (see FIG. 2) contained in the received data, and outputs modulated data (91 bytes) obtained by removing the sync code from this data. Furthermore, the sync demodulation block 13 also outputs address information indicating the location of the output demodulated data in the error correction code block shown in FIG. 1.

A RAM control block 18 stores the demodulated data output from the sync demodulation block 13 in a RAM 17. The demodulated data is also input to a PI syndrome calculation circuit 14 in parallel with the storage process in the RAM 17. The PI syndrome calculation circuit 14 calculates a syndrome so that the syndrome calculations can be realized by only 91 bytes of the demodulated data.

An arrival history information block 16 generates history information of a frame arrival state on the basis of the address information output form the sync demodulation block 13. That is, the arrival history information block 16 manages the read-out state of data from the disk for respective Sync frames. The PI syndrome calculation circuit 14 confirms history information generated by the arrival history information block 16 prior to the syndrome calculations of 91 bytes, and always checks if frame loss, frame duplication, or the like has occurred.

The sync demodulation block 13 generates address information on the basis of ID information and sync codes contained in data read out from the disk while effecting sync protection. If a sync operation does not suffer any abnormality, all pieces of address information sent to the arrival history information block 16 assume serial values. The arrival history information block 16 may adopt a configuration for storing all pieces of address information, or a bitmap configuration with addresses of error correction code blocks.

Data recorded on a DVD have undergone an interleave process. Hence, demodulated data do not always arrive in the data arrangement order shown in FIG. 1. The RAM control block 18 and PI syndrome calculation circuit 14 execute storage and calculation processes while applying a deinterleave process on the basis of the address information.

If no sync error is found, all data in an error correction code block arrive without any loss or duplication, and are stored in the RAM 17. Also, PI syndrome calculations are executed after all data sequences are obtained. The PI syndrome calculation results are stored in a PI syndrome buffer memory 15.

An error correction circuit 19 executes an error correction process using the PI syndrome calculation results.

For example, when a correction process is executed from a PI sequence, an error pattern and error location are calculated using the PI syndrome calculation results to correct an information error in the RAM 17. At this time, if all the PI syndrome calculation results are zero, no error is determined, and an error correction process is skipped.

On the other hand, when a correction process is executed from a PO sequence with a larger code length, a data sequence in the PO direction is read out from the RAM 17, and a PO syndrome calculation circuit included in the error correction circuit 19 executes syndrome calculations. After that, an error pattern and error location are calculated to correct an information error in the RAM 17. In this case, loss correction can be executed by exploiting address information of a data sequence with "non-zero" PI syndrome calculation results, and the correction performance can be improved compared to normal correction.

After all correction processes are completed, and all information errors have been removed from the data in the RAM 17, a descrambler/EDC block 20 executes a final error check process via the RAM control block 18, and data is transmitted to a host via an interface 21.

A method of realizing syndrome calculations using data of only 91 bytes will be explained in detail below. In a coding theory used in an error correction process, input data $I_0$ to $I_{181}$ of a PI sequence are handled as input information equation $I(x)$ given by:

$$I(x) = I_0 x^{181} + I_1 x^{180} + \ldots I_{180} x + I_{181}$$

The syndrome values of the PI sequence are calculated by substituting $\alpha^0$ to $\alpha^9$ as the roots of the Galois field in this input information equation $I(x)$ and are given by:

$$S_0 = I(\alpha^0) = I_0 + I_1 + \ldots + I_{180} + I_{181}$$

$$S_1 = I(\alpha^1) = I_0 \alpha^{181} + I_1 \alpha^{180} + \ldots + I_{180} \alpha + I_{181}$$

.
.

$$S_9 = I(\alpha^9) = I_0 \alpha^{9 \times 181} + I_1 \alpha^{9 \times 180} + \ldots + I_{180} \alpha^9 + I_{181}$$

If all these syndrome values $S_0$ to $S_9$ are zero, they indicate that reproduction data is free from any errors. However, in order to effect syndrome calculation equations, data of 182 bytes are required.

On the other hand, the above equations can be rewritten as:

$$S_0 = (I_0 + I_1 + \ldots + I_{89} + I_{90}) + (I_{91} + I_{92} + \ldots + I_{180} + I_{181})$$

$$S_1 = (I_0\alpha^{90} + I_1\alpha^{89} + \ldots + I_{89}\alpha + I_{90})\alpha^{91} + (I_{91}\alpha^{90} + I_{92}\alpha^{89} + \ldots + I_{180}\alpha + I_{181})$$

.

.

$$S_9 = (I_0\alpha^{9 \times 90} + I_1\alpha^{9 \times 89} + \ldots + I_{89}\alpha^9 + I_{90})\alpha^{9 \times 91} + (I_{91}\alpha^{9 \times 90} + I_{92}\alpha^{9 \times 89} + \ldots + I_{180}\alpha^9 + I_{181})$$

A formula in the former parentheses of each syndrome calculation equation represents the syndrome calculation result of the first 91 bytes of the PI data sequence. Also, a formula in the latter parentheses represents the syndrome calculation result of the second 91 bytes.

That is, in case of the code length of 182 bytes, when the syndrome calculations are completed by the Sync frame of the first 91 bytes, the syndrome calculation result of 91 bytes can be multiplied by $\alpha^{n \times 91}$ (where n is the syndrome degree).

When the syndrome calculations are completed by the Sync frame of the second 91 bytes, the syndrome calculation result of 91 bytes can be directly used.

Figure 4:
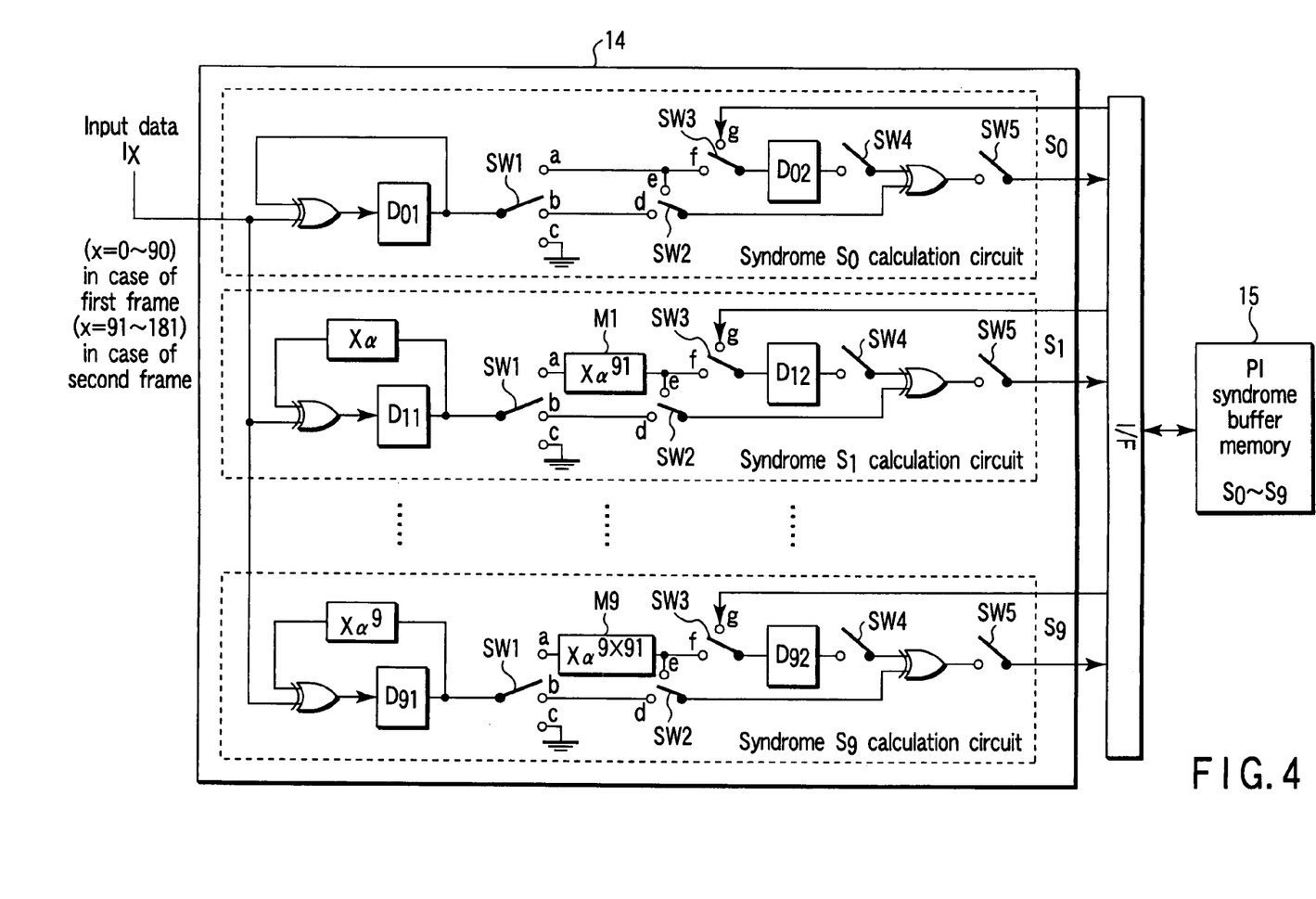
FIG. 4 is a block diagram showing details of a PI syndrome calculation circuit and PI syndrome buffer memory.
Figure 5:
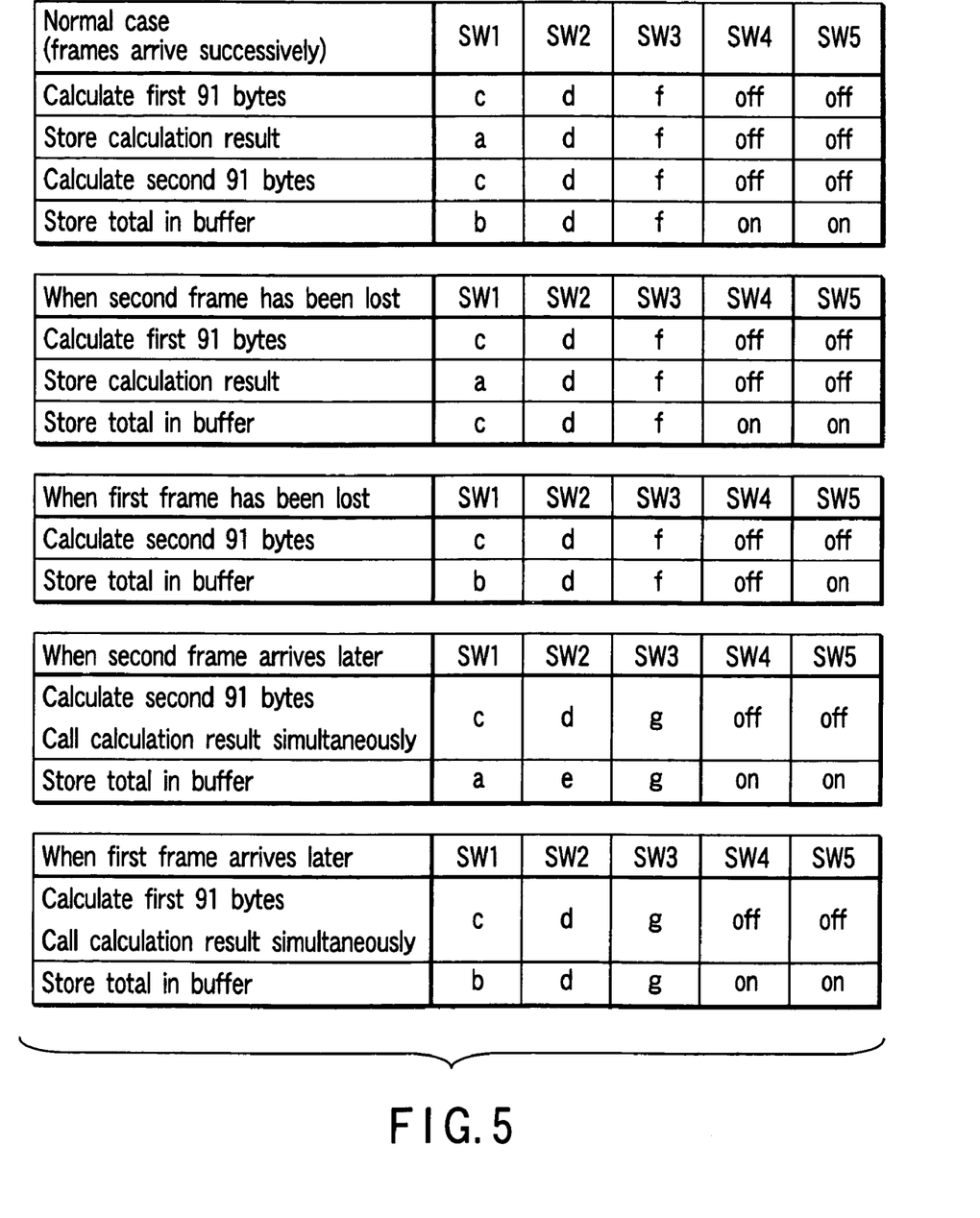
FIG. 5 is a table showing sequences of respective switches in the PI syndrome calculation circuit shown in FIG. 4.

FIG. 4 is a block diagram showing details of the PI syndrome calculation circuit 14 and PI syndrome buffer memory 15. FIG. 5 shows the sequences of respective switches in the PI syndrome calculation circuit 14 shown in FIG. 4. The operations will be described below with reference to FIGS. 4 and 5.

In the PI syndrome calculation circuit 14 shown in FIG. 4, switches SW1 to SW5 operate in cooperation with each other in syndrome $S_0$ to $S_9$ calculation circuits.

A normal operation free from any sync error will be examined first. While the switches SW1 are flipped to the c side, 91 clocks are given to the circuit to execute syndrome calculations for only the first 91 bytes. The calculation results are latched by registers $D_{01}$ to $D_{91}$.

Prior to the process of the second 91 bytes, the switches SW1 are flipped to the a side, and the switches SW3 are flipped to the f side. Multipliers M1 to M9 multiply the syndrome calculation results by $\alpha^{n \times 91}$, and the products are latched by registers $D_{02}$ to $D_{92}$. During this process, the switches SW5 are kept OFF.

Subsequently, syndrome calculations of the second 91 bytes are executed while the switches SW1 are flipped to the c side as in the first 91 bytes, and the calculation results are latched by the registers $D_{01}$ to $D_{91}$ again. Upon completion of the calculations of the second 91 bytes, the switches SW1 are flipped to the b side in turn, the switches SW2 are flipped to the d side, and the switches SW4 are turned on, thus completing the EXORs of the syndrome calculation results of the first 91 bytes and the second 91 bytes. After that, the switches SW5 are turned on, thus storing the syndrome calculation results of the PI data sequence with a code length of 182 bytes in the PI syndrome buffer 15.

A method of coping with a case wherein frame loss has occurred will be explained below. A case will be exemplified below wherein the second 91 bytes have been lost. Such case is detected when the address of the Sync frame of the next 91 bytes does not match that of the Sync frame of the second 91 bytes while the syndrome calculation results of the first 91 bytes are stored in the registers $D_{02}$ to $D_{92}$. In this case, the second frame loss is determined, and the calculation results in the registers are stored in the PI syndrome buffer 15 as the syndrome calculation results of the PI data sequence of a code length of 182 bytes by flipping the switches SW1 to the c side, and turning on the switches SW4 and SW5.

On the other hand, the loss of the first 91 bytes is detected when an input address indicates that of second 91 bytes upon inputting the first 91 bytes in the normal operation. In such case, syndrome calculations for 91 bytes are made while flipping the switches SW1 to the c side, and results are latched by the registers $D_{01}$ to $D_{91}$. Upon completion of the calculations, the switches SW1 are flipped to the b side, the switches SW2 are flipped to the d side, the switches SW4 are turned off, and the switches SW5 are turned on. Then, the calculation results in the registers are stored in the PI syndrome buffer 15 as the syndrome calculation results of the PI data sequence of the code length of 182 bytes.

These syndrome calculation results obtained when data loss has occurred are equivalent to those calculated by using apparent zero data for those lost 91 bytes.

A case will be exemplified wherein the arrival order of frames is reversed. Such frame reverse is detected when the calculation results are temporarily stored in the PI syndrome buffer 15 upon detection of a frame loss, but the frame which is determined as the lost frame arrives anew. In such case, the syndrome calculation results stored in the PI syndrome buffer 15 must be called back.

For example, when the Sync frame of the first 91 bytes arrives anew, the switches SW1 are flipped to the c side to execute syndrome calculations for the first 91 bytes as in normal operation, and the calculation results are latched by the registers $D_{01}$ to $D_{91}$. In parallel with these calculations, the switches SW3 are flipped to the g side to call the syndrome results for the second 91 bytes in the PI syndrome buffer 15 to latch them by the registers $D_{02}$ to $D_{92}$. Upon completion of the calculations of the first 91 bytes, the switches SW1 are flipped to the a side, and the switches SW2 are flipped to the e side. Then, the multipliers M1 to M9 multiply the results by $\alpha^{n \times 91}$. Also, the switches SW4 are turned on to compute the EXORs of the products and the calculation results of the second 91 bytes in the registers $D_{02}$ to $D_{92}$. After that, the switches SW5 are turned on to write the EXORs as the syndrome calculation results of the PI data sequence of the code length of 182 bytes in the PI syndrome buffer 15 again.

Likewise, when the Sync frame of the second 91 bytes arrives anew, the switches SW1 are flipped to the c side to execute syndrome calculations for the second 91 bytes as in normal operation, and the calculation results are latched by the registers $D_{01}$ to $D_{91}$. In parallel with these calculations, the switches SW3 are flipped to the g side to call the syndrome results for the first 91 bytes in the PI syndrome buffer 15 to latch them by the registers $D_{02}$ to $D_{92}$. Upon completion of the calculations of the second 91 bytes, the switches SW1 are flipped to the b side, the switches SW2 are flipped to the d side, and the switches SW4 are turned on. Then, the EXORs of the calculation results in the registers $D_{01}$ to $D_{91}$ and the calculation results of the first 91 bytes in the registers $D_{02}$ to $D_{92}$ are computed. After that, the switches SW5 are turned on to write the EXORs as the syndrome calculation results of the PI data sequence of the code length of 182 bytes in the PI syndrome buffer 15 again.

Next, a case will be explained below wherein frame duplication has occurred. Frame duplication is detected when a frame with an identical address arrives again. In this case, the PI syndrome calculation circuit 14 recognizes re-arrival of the identical address on the basis of the history information of the arrival history information block 16, and skips the calculation process by ignoring the data of 91 bytes.

As described above, the circuit blocks with the arrangement shown in FIG. 4 can always realize syndrome calculations even when frame loss, frame reverse, and frame duplication have occurred.

When this PI syndrome calculation circuit 14 is used, matching with the RAM 17 that stores playback information as main data must be taken account. In case of frame loss, the PI syndrome calculation circuit 14 executes processes using apparent zero data. For this reason, when a DRAM or the like is used as the RAM 17, data other than zero data may remain stored in the RAM 17 as garbage data. For this reason, the error correction circuit 19 pads data on the RAM at the lost address with zero data on the basis of the information of the arrival history information block 16 prior to the error correction process. When both the first and second Sync frames have been lost, data in the PI syndrome buffer memory 15 must also be taken account. If extra data remain stored, it is similarly padded with zero data.

Furthermore, in such case, data appears to suffer no information error since syndromes are zero data. For this reason, when erasure correction of a PO sequence is used, the history information of the arrival history information block 16 is used in addition to information indicating that syndromes are "not zero", thus preventing correction errors due to this process.

Figure 6:
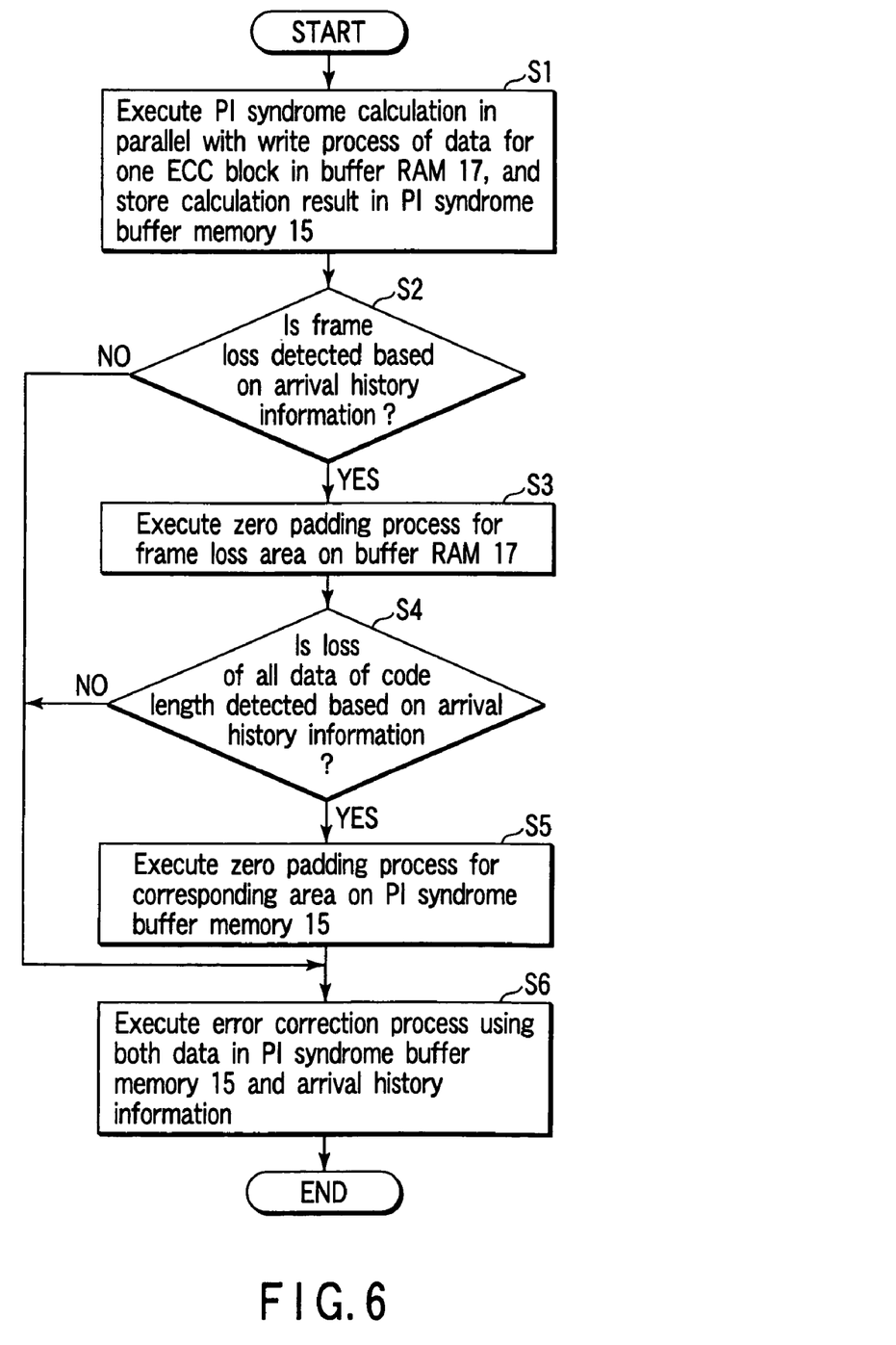
FIG. 6 is a flowchart showing the sequence of an error correction process.

FIG. 6 is a flowchart showing the sequence of the aforementioned error correction process. Data for one error correction block are written in the RAM 17. In parallel with this write process, PI syndromes are calculated, and PI syndrome calculation results are stored in the PI syndrome buffer memory 15 (S1).

If it is detected based on the arrival history information stored in the arrival history information block 16 that frame loss has occurred (S2, YES), an area on the RAM 17 corresponding to the lost frame is padded with zero data (S3).

If it is detected based on the arrival history information stored in the arrival history information block 16 that all data of the code length has been lost (S4, YES), extra data in the PI syndrome buffer memory 15 are padded with zero data (S5).

An error correction process is executed using the data in the PI syndrome buffer memory 15 and the arrival history information stored in the arrival history information block 16 (S6).

The functions and effects of the present invention described above will be summarized below.

(1) A data processing apparatus and method according to an embodiment of the present invention can complete syndrome calculations as an error correction code for each sync frame. For this reason, even when frame loss or the like has occurred due to abnormality in a sync system, syndrome calculation results in parallel with the data write process to the buffer memory can be effectively used. Furthermore, diffusion of errors due to sync system abnormality can be prevented, and an error correction performance drop caused by such diffusion of errors can also be prevented.

(2) A data processing apparatus and method according to an embodiment of the present invention have an arrival history of Sync frames. Hence, frame loss, frame duplication, reverse of the order of frames can always be recognized. Then, a syndrome calculation process that can cope with these problems of frame loss, frame duplication, reverse of the order of frames can be selectively executed.

(3) A data processing apparatus and method according to an embodiment of the present invention prevent correction errors using arrival history information of Sync frames in addition to the syndrome calculation results, thus implementing more reliable error detection and error correction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data processing apparatus for processing data read out from an information storage medium, data to be recorded on the information storage medium for respective recording units being a data block with sync codes, the data block being a block generated by inserting sync codes at predetermined intervals for sector data, the sector data being generated from some data of the data block with error correction codes, the data block containing data in row and column directions, one data sequence containing a first sync frame and a second sync frame;

the first sync frame containing a first sync code and some data of the sector data, the second sync frame containing a second sync code and some data of the sector data, a demodulated data sequence obtained by removing the first and second sync codes from one data sequence being data that contains the error correction codes, and error correction being able to be attained for each demodulated data sequence, the data processing apparatus comprising:

a demodulation unit configured to output the demodulated data sequence on the basis of data in the information storage medium and output address information corresponding to the demodulated data sequence; and a syndrome calculation unit configured to calculate a syndrome of the demodulated data sequence containing a first demodulated data sequence and a second demodulated data sequence, wherein the syndrome calculation unit enables a syndrome calculation of the demodulated data sequence by detecting a data loss in the first sync frame and the second sync frame on the basis of the address information, performing switching on the basis of the detection of the first demodulated data sequence corresponding to the first sync frame, calculating a first syndrome of the first demodulated data sequence by a first calculation, performing switching on the basis of the detection of the second demodulated data sequence corresponding to the second sync frame, calculating a second syndrome of the second demodulated data sequence by a second calculation, setting the first syndrome as binary 0 on the basis of a loss detection of the first demodulated data sequence, setting the second syndrome as binary 0 on the basis of a loss detection of the second demodulated data sequence, and outputting the syndrome of the demodulated data sequence on the basis of the first syndrome and the second syndrome.

2. An apparatus according to claim 1, further comprising:

a storage unit configured to store the demodulated data sequence; and an error correction unit configured to detect and correct any errors contained in the demodulated data sequence stored in the storage unit, wherein the syndrome calculation unit calculates the syndrome of the demodulated data sequence in parallel with the storage process of the demodulated data sequence by the storage unit.

3. An apparatus according to claim 2, further comprising:

a calculation result storage unit configured to store the syndrome calculation result calculated by the syndrome calculation unit; and a management unit configured to manage a read-out state of data from the information storage medium for respective sync frames, wherein the syndrome calculation unit recalculates the syndrome of the demodulated data sequence by detecting a change in order in which the first and second sync frames arrive on the basis of the read-out state of data managed by the management unit, and reading out the syndrome stored in the calculation result storage unit.

4. An apparatus according to claim 3, wherein the error correction unit detects and corrects any errors on the basis of the syndrome calculation result stored in the calculation result storage unit, and the read-out state of data managed by the management unit.

5. A data processing method for processing data read out from an information storage medium, data to be recorded on the information storage medium for respective recording units being a data block with sync codes, the data block being a block generated by inserting sync codes at predetermined intervals for sector data, the sector data being generated from some data of the data block with error correction codes, the data block containing data in row and column directions, one data sequence containing a first sync frame and a second sync frame;

the first sync frame containing a first sync code and some data of the sector data, the second sync frame containing a second sync code and some data of the sector data, a demodulated data sequence obtained by removing the sync codes from one data sequence being data that contains the error correction codes, and error correction being able to be attained for each demodulated data sequence, the data processing method comprising:

outputting the demodulated data sequence on the basis of data in the information storage medium, and outputting address information corresponding to the demodulated data sequence;

executing a syndrome calculation of the demodulated data sequence containing a first demodulated data sequence and a second demodulated data sequence by detecting a data loss in the first sync frame and the second sync frame on the basis of the address information, performing switching on the basis of the detection of the first demodulated data sequence corresponding to the first sync frame, calculating a first syndrome of the first demodulated data sequence by a first calculation, performing switching on the basis of the detection of the second demodulated data sequence corresponding to the second sync frame, calculating a second syndrome of the second demodulated data sequence by a second calculation, setting the first syndrome as binary 0 on the basis of a loss detection of the first demodulated data sequence, setting the second syndrome as binary 0 on the basis of a loss detection of the second demodulated data sequence, and outputting the syndrome of the demodulated data sequence on the basis of the first syndrome and the second syndrome.

6. A method according to claim 5, further comprising:

calculating, when the demodulated data sequence is stored and any errors contained in the demodulated data sequence are to be detected and corrected, the syndrome of the demodulated data sequence in parallel with the storage process of the demodulated data sequence.

7. A method according to claim 6, further comprising:

storing the syndrome calculation result, managing a read-out state of data from the information storage medium for respective first and second sync frames, reading out the stored syndrome calculation result by detecting a change in order in which the first and second sync frames arrive on the basis of the managed read-out state of data by the management unit, and recalculating the syndrome of the demodulated data sequence.

8. A method according to claim 7, wherein the calculated syndrome calculation result is stored, and any errors are detected and corrected on the basis of the stored syndrome calculation result and the managed read-out state of data.

* * * * *